(12) United States Patent
Kishimoto et al.

(10) Patent No.: US 10,009,970 B2
(45) Date of Patent: Jun. 26, 2018

(54) POWER SUPPLY DEVICE, SOLID-STATE LIGHT-EMITTING ELEMENT LIGHTING DEVICE, LAMP, AUTOMOTIVE LAMP, VEHICLE, AND METHOD FOR CONTROLLING POWER CONVERTERS

(71) Applicant: Panasonic Intellectual Property Management Co., Ltd., Osaka (JP)

(72) Inventors: Akihiro Kishimoto, Osaka (JP); Toshiaki Nakamura, Osaka (JP); Kenichi Fukuda, Osaka (JP); Kazuya Kato, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days. days.

(21) Appl. No.: 15/681,053

(22) Filed: Aug. 18, 2017

(65) Prior Publication Data

US 2018/0063909 A1 Mar. 1, 2018

(30) Foreign Application Priority Data

Aug. 30, 2016 (JP) ................................. 2016-168588

(51) Int. Cl.
*B60Q 1/14* (2006.01)
*H05B 33/08* (2006.01)
(Continued)

(52) U.S. Cl.
CPC ....... *H05B 33/0815* (2013.01); *B60Q 1/0094* (2013.01); *B60Q 1/04* (2013.01);
(Continued)

(58) Field of Classification Search
CPC ... B60C 1/0094; B60C 1/1415; B60C 1/1423; B60C 2300/47; H05B 33/0815; H05B 33/0845
(Continued)

(56) References Cited

U.S. PATENT DOCUMENTS

2013/0249430 A1* 9/2013 Oepts ................. H05B 33/0848
315/250
2014/0203705 A1* 7/2014 Ohmura .................. H02M 1/44
315/77

(Continued)

FOREIGN PATENT DOCUMENTS

JP          2011-113642 A       6/2011

*Primary Examiner* — Tung X Le
(74) *Attorney, Agent, or Firm* — Renner, Otto, Boisselle & Sklar, LLP

(57) ABSTRACT

A power supply device includes converters, a command circuit, and a setter. The converters correspond to loads. The command circuit controls the converters. The setter sets a magnitude of an output of at least one target converter of the converters in accordance with an output characteristic representing a relationship between an input voltage of the at least one target converter and an output limit value which is an upper limit value of the output from the at least one target converter. The output characteristic is a characteristic that the output limit value decreases as the input voltage lowers when the input voltage is lower than a threshold. The setter varies the threshold of the output characteristic in accordance with an operation status of the converters and sets the magnitude of the output from the at least one target converter in accordance with the output characteristic whose threshold has been varied.

20 Claims, 9 Drawing Sheets

(51) Int. Cl.
 *B60Q 1/00* (2006.01)
 *B60Q 1/04* (2006.01)
 *H02M 3/335* (2006.01)
(52) U.S. Cl.
 CPC ......... *B60Q 1/1415* (2013.01); *B60Q 1/1423* (2013.01); *H02M 3/33523* (2013.01); *H05B 33/0845* (2013.01); *H05B 33/0851* (2013.01)
(58) Field of Classification Search
 USPC ..................................................... 315/77, 82
 See application file for complete search history.

(56) References Cited

U.S. PATENT DOCUMENTS

2014/0354166 A1* 12/2014 Yu ...................... H05B 33/0818
  315/201
2018/0007756 A1* 1/2018 Hong ................. H05B 33/0845

* cited by examiner

POWER SUPPLY DEVICE, SOLID-STATE LIGHT-EMITTING ELEMENT LIGHTING DEVICE, LAMP, AUTOMOTIVE LAMP, VEHICLE, AND METHOD FOR CONTROLLING POWER CONVERTERS

CROSS-REFERENCE TO RELATED APPLICATION

The present application is based upon and claims the benefit of priority of Japanese Patent Application No. 2016-168588, filed on Aug. 30, 2016, the entire contents of which are incorporated herein by reference.

TECHNICAL FIELD

The present disclosure relates to power supply devices, solid light-emitting element lighting devices, lamps, automotive lamp, vehicles, and methods, and specifically to a power supply device for receiving electric power from a direct-current power supply, a solid light-emitting element lighting device including the power supply device, a lamp and an automotive lamp including the solid light-emitting element lighting device, a vehicle including the lamp, and a method for controlling power converters.

BACKGROUND ART

JP 2011-113642 A (hereinafter referred to as "Document 1") discloses a lighting device including a converter which uses electric power from an input power supply to output electric power required by a load. The lighting device described in Document 1 is configured so as to reduce an output current output from the converter in a range in which an input voltage to the converter is lower than a threshold voltage.

However, in a power supply device configured to simultaneously control a plurality of converters, an input voltage to each of the converters decreases more in the case of operation of the plurality of converters than in the case of operation of one converter. In a range in which the input voltage is lower than a threshold voltage, a reduction amount of an output from each converter increases more in the case of operation of the plurality of converters than in the case of operation of one converter. Thus, in accordance with the operation status of the plurality of converters, the input voltage varies, and an output from each converter thus also varies.

SUMMARY

In view of the foregoing, one of the objectives of the present disclosure is to provide a power supply device which enables a stable output from a target converter to a load even when a plurality of converters are provided, a solid light-emitting element lighting device including the power supply device, a lamp and an automotive lamp including the solid light-emitting element lighting device, a vehicle including the lamp, and a method for controlling power converters.

A power supply device according to one aspect of the present disclosure includes a plurality of converters, a command circuit, and a setting circuit. The plurality of converters are each configured to convert electric power supplied from a direct-current power supply into electric power required by a corresponding load of a plurality of loads. The command circuit is configured to control the plurality of converters. The setting circuit is configured to set a magnitude of an output from at least one target converter of the plurality of converters in accordance with an output characteristic representing a relationship between an input voltage of the at least one target converter and an output limit value which is an upper limit value of the output from the at least one target converter. The output characteristic is a characteristic that the output limit value decreases as the input voltage lowers when the input voltage is lower than a threshold. The setting circuit varies the threshold of the output characteristic in accordance with an operation status of the plurality of converters and sets the magnitude of the output from the at least one target converter in accordance with the output characteristic whose threshold has been varied by the setting circuit.

A solid light-emitting element lighting device according to one aspect of the present disclosure includes the power supply device. The plurality of loads are solid-state light-emitting elements connected to the power supply device.

A lamp according to one aspect of the present disclosure includes the solid light-emitting element lighting device, a plurality of solid-state light-emitting elements, and a lamp body. The plurality of solid-state light-emitting elements are lit by the solid light-emitting element lighting device. The lamp body accommodates the plurality of solid-state light-emitting elements.

An automotive lamp according to one aspect of the present disclosure includes the solid light-emitting element lighting device, a plurality of solid-state light-emitting elements, and an automotive lamp body. The plurality of solid-state light-emitting elements are lit by the solid light-emitting element lighting device. The automotive lamp body accommodates the plurality of solid-state light-emitting elements.

A vehicle according to one aspect of the present disclosure includes the lamp and a vehicle body to which the lamp is attached.

A method according to one aspect of the present disclosure is for controlling a plurality of power converters. The plurality of converters are each configured to convert electric power supplied from a direct-current power supply into electric power required by a corresponding load of a plurality of loads. The method includes: setting a magnitude of an output from at least one target converter of the plurality of converters in accordance with an output characteristic representing a relationship between an input voltage of the at least one target converter and an output limit value which is an upper limit value of the output from the at least one target converter, the output characteristic being a characteristic that the output limit value decreases as the input voltage lowers when the input voltage is lower than a threshold, and varying the threshold of the output characteristic in accordance with an operation status of the plurality of converters and setting the magnitude of the output from the at least one target converter in accordance with the output characteristic whose threshold has been varied.

BRIEF DESCRIPTION OF THE DRAWINGS

The figures depict one or more implementation in accordance with the present teaching, by way of example only, not by way of limitations. In the figures, like reference numerals refer to the same or similar elements.

DETAILED DESCRIPTION

With reference to drawings, a power supply device according to first to fourth embodiments, a lamp according to a fifth embodiment, and a vehicle according to a sixth embodiment will be described in detail below.

In the power supply device according to each embodiment, at least one target converter of a plurality of converters operates in accordance with a predefined output characteristic representing a relationship between an input voltage of the target converter and an output limit value which is an upper limit value of an output from the target converter. The output characteristic is a characteristic that the output limit value decreases as the input voltage lowers when the input voltage is lower than a threshold. A setter varies the threshold of the output characteristic in accordance with the operation status of the plurality of converters and sets the magnitude of the output in accordance with the varied output characteristic whose threshold has been varied.

First Embodiment

Figure 1:
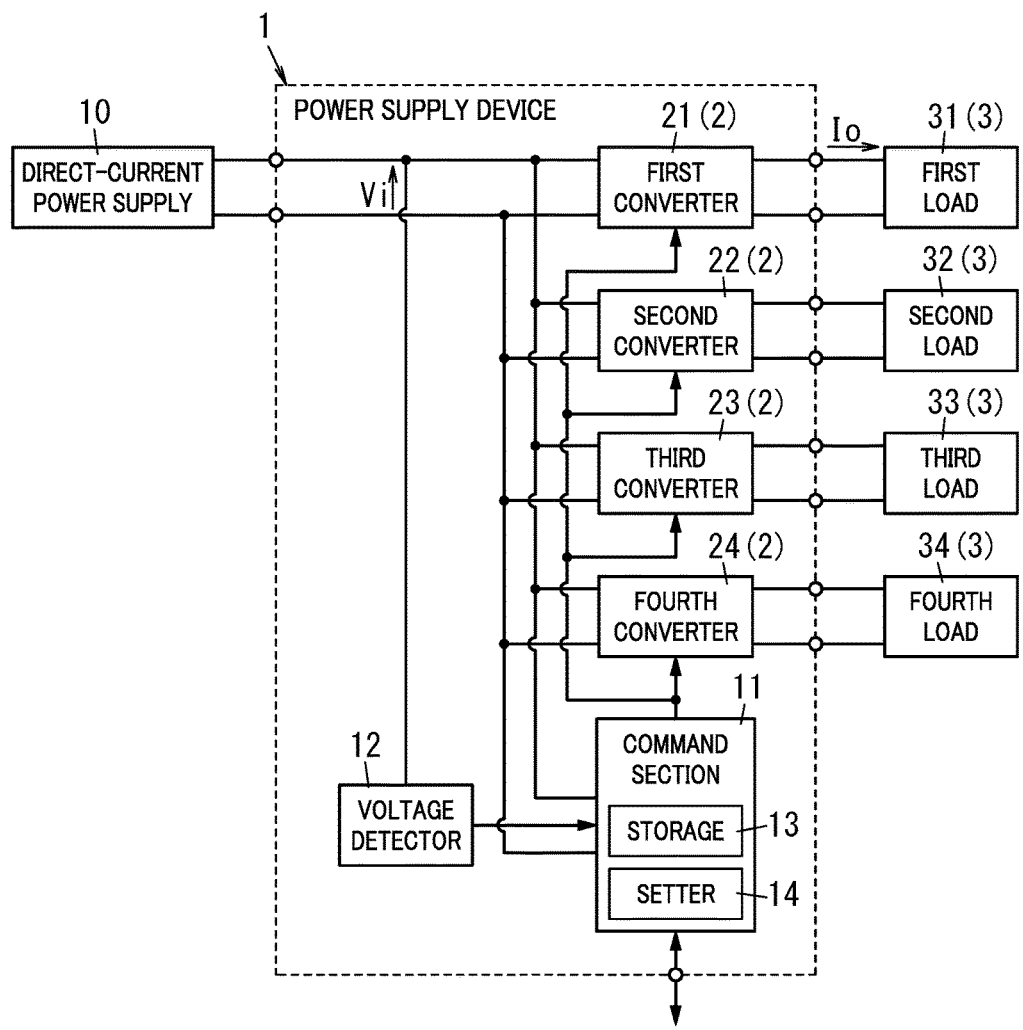
FIG. 1 is a block diagram illustrating a power supply device according to a first embodiment.

As illustrated in FIG. 1, a power supply device 1 according to a first embodiment includes a plurality of (in FIG. 1, four) converters 2, a command section (command circuit) 11 configured to control the plurality of converters 2, and a voltage detector (voltage detection circuit) 12 configured to detect an input voltage Vi of the plurality of converters 2.

The voltage detector 12 is connected between a direct-current power supply 10 and the plurality of converters 2, detects the input voltage Vi of the plurality of converters 2, and outputs an input voltage detection value (a value corresponding to the voltage value of the input voltage Vi) to the command section 11.

The plurality of converters 2 correspond to a plurality of loads 3. Each of the plurality of converters 2 is configured to convert electric power supplied from the direct-current power supply 10 into electric power required by a corresponding one of the loads 3. Specifically, the plurality of converters 2 include a first converter 21, a second converter 22, a third converter 23, and a fourth converter 24. The first converter 21 corresponds to a first load 31, the second converter 22 corresponds to a second load 32, the third converter 23 corresponds to a third load 33, and the fourth converter 24 corresponds to a fourth load 34.

Each of the plurality of loads 3 is a light source such as a solid-state light-emitting element. Examples of the solid-state light-emitting element include light-emitting diodes (LEDs) and organic electroluminescence (EL) elements. Each load 3 is not limited to the light source but may be, for example, a cooling fan or an actuator. That is, it is only required that each load 3 is an electric apparatus which operates when electric power is supplied to the load 3.

The command section 11 includes a storage 13 and a setter (setting circuit) 14 and transmits/receives signals individually to/from the plurality of converters 2 by using, for example, serial communication. Moreover, the command section 11 transmits/receives a signal to/from an external apparatus (not shown) such as a control unit of a vehicle. An example of the control unit of the vehicle includes an Engine Control Unit (ECU). The command section 11 receives electric power from the direct-current power supply 10. The command section 11 includes a microcomputer and its peripheral circuits. The microcomputer includes a processor and memory (the storage 13). The processor executes a program in the storage 13 to carry out the functions described herein.

The storage 13 stores a later-described output characteristic of at least one target converter of the plurality of converters 2. The case where the target converter is the first converter 21 will hereinafter be described, but the target converter is not limited to the first converter 21 but may be any one or more of the second to fourth converters 22 to 24, up to all of the first to fourth converters 21 to 24. That is, the target converter may be at least one of the first to second converters 21 to 24.

Figure 2:
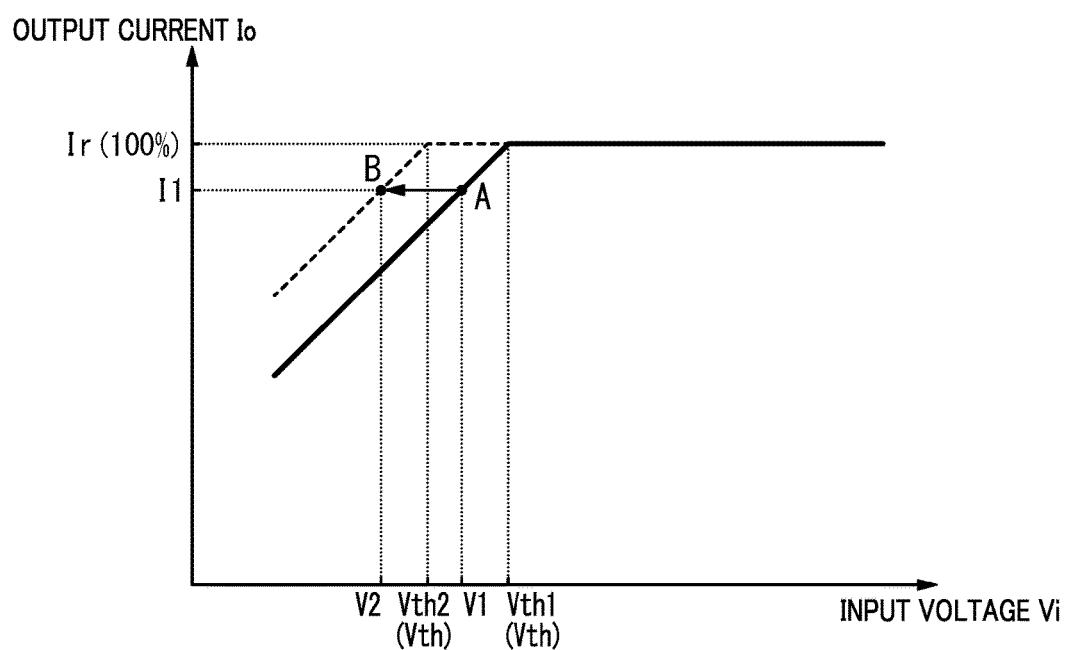
FIG. 2 is an explanatory drawing illustrating operation of the power supply device.

As illustrated in FIG. 2, the output characteristic is a characteristic representing a relationship between an input voltage Vi of the first converter 21 (target converter) and a corresponding current limit value (output limit value) which is an upper limit value of an output current Io (output) from the first converter 21. The output characteristic is a characteristic that the current limit value of the output current Io decreases as the input voltage Vi lowers when the input voltage Vi of the first converter 21 is lower than a threshold Vth (a threshold Vth1 in the case of the solid line in FIG. 2, a threshold Vth2 in the case of the broken line in FIG. 2). In contrast, when the input voltage Vi is higher than the threshold Vth, the current limit value of the output current Io is constant independently of the magnitude of the input voltage Vi. The output characteristic is not limited to the characteristic representing the relationship between the input voltage Vi and the output current Io but may be, for example, a characteristic representing a relationship between the input voltage Vi and output power of the target converter. Moreover, the output characteristic stored in the storage 13 may be, for example, a function utilized by the setter 14 to calculate the current limit value based on the input voltage Vi, or a look-up table as long as it can represent the characteristic shown in FIG. 2.

Moreover, in the output characteristic, when the input voltage Vi is lower than the threshold Vth, the change amount of the current limit value with respect to the unit amount of the input voltage Vi is constant. That is, when the input voltage Vi is lower than the threshold Vth, the current limit value of the output current Io decreases along a primary function. The current limit value of the output current Io is not limited to decrease along the primary function, and may decrease along a function that includes not only linear but also others (e.g., exponential).

The setter 14 shown in FIG. 1 sets the magnitude (current command value) of the output current Io of at least one target converter of the plurality of converters 2 in accordance with the output characteristic stored in the storage 13. The setter 14 transmits a signal based on the current command value of the output current Io set in accordance with the output characteristic to the target converter. When the target converter is the first converter 21, the setter 14 sets the current command value of the output current Io in accordance with the output characteristic stored in the storage 13 and transmits a signal based on a set current command value to the first converter 21.

Here, as illustrated in FIG. 2, the storage 13 stores a plurality of output characteristics of the first converter 21 depending on the operation status of the plurality of converters 2. The solid line in FIG. 2 shows the output characteristic of the first converter 21 in the case where only the first converter 21 of the plurality of converters 2 operates. The broken line in FIG. 2 shows the output characteristic of the first converter 21 in the case where all the plurality of converters 2 operate. In the output characteristic of the case where only the first converter 21 operates, the threshold Vth is Vth1, whereas in the output characteristic of the case where all of the plurality of converters 2 operate, the threshold Vth is Vth2 (<Vth1). The two output characteristics shown in FIG. 2 show a constant angle of tilt, i.e., slope, of the output current Io with respect to the input voltage Vi in the range in which the input voltage Vi is lower than the threshold Vth.

The setter 14 varies the threshold Vth of the output characteristic of the first converter 21 in accordance with the operation status of the plurality of converters 2. In other words, the setter 14 varies the output characteristic of the first converter 21 in accordance with the operation status of the plurality of converters 2. The setter 14 sets the current command value of the output current Io in accordance with the output characteristic which has been varied.

Next, operation of the power supply device 1 according to the first embodiment will be described. The storage 13 of the command section 11 stores the output characteristics.

First, the case where only the first converter 21 of the plurality of converters 2 operates will be described. At an initial time point, the output of the first converter 21 is off.

First, the command section 11 receives an ON command for operating the first converter 21 and a current request value of the output current Io of the first converter 21 from an external apparatus (not shown). The command section 11 determines whether or not the input voltage Vi detected by the voltage detector 12 is lower than the threshold Vth. If the input voltage Vi is higher than or equal to the threshold Vth, the command section 11 sets a current command value to the current request value received from the external apparatus. In contrast, if the input voltage Vi is lower than the threshold Vth, the command section 11 determines a current limit value corresponding to the input voltage Vi in accordance with the output characteristics stored in the storage 13. More specifically, when the input voltage Vi is lower than the threshold Vth, the command section 11 determines a current limit value corresponding to the input voltage Vi detected by the voltage detector 12 in accordance with the output characteristics of the case where only the first converter 21 of the plurality of converters 2 operate. If the current request value is larger than or equal to the current limit value, the command section 11 sets a current command value to the current limit value, whereas if the current request value is smaller than the current limit value, the command section 11 sets the current command value to the current request value. Then, the command section 11 transmits an operation start command for starting the operation of the first converter 21 and the set current command value to the first converter 21.

When receiving the operation start command and the current command value from the command section 11, the first converter 21 operates such that the output current Io is the current command value.

Next, the case where the second to fourth converters 22 to 24 further operate after the operation of the first converter 21 starts operating will be described. The input voltage Vi is lower than the threshold Vth.

First, the command section 11 receives an ON command for operating the second to fourth converters 22 to 24 in addition to the first converter 21, and the current request value of the output currents of the second to fourth converters 22 to 24 from the external apparatus. The command section 11 transmits the operation start command and the current request value to the second to fourth converters 22 to 24.

When receiving the operation start command and the current request value, the second to fourth converters 22 to 24 start operating. Starting the operation of the second to fourth converters 22 to 24 reduces the input voltage Vi. The second to fourth converters 22 to 24 transmit to the command section 11 operation information representing that they are operating.

When obtaining the operation information from the second to fourth converters 22 to 24, the command section 11 varies the output characteristic of the first converter 21. More specifically, the command section 11 varies the output characteristic for the first converter 21 used to determine the current limit value in accordance with an output characteristic of the case where only the first converter 21 of the plurality of converters 2 operates (solid line in FIG. 2) to an output characteristic of the case where all of the plurality of converters 2 operate (broken line in FIG. 2). Then, the command section 11 newly determines a current limit value corresponding to the input voltage Vi in accordance with the varied output characteristic. That is, the command section 11 determines the current limit value corresponding to the input voltage Vi in accordance with the output characteristic of the case where all of the plurality of converters 2 operate. If the current request value is larger than or equal to the current limit value, the command section 11 sets a current command value to the current limit value, whereas if the current request value is smaller than the current limit value, the command section 11 sets the current command value to the current request value. The command section 11 transmits the current command value to the first converter 21. The first converter 21 operates so that the output current Io has the current command value.

For example, as illustrated in FIG. 2, when the input voltage Vi of the first converter 21 has the voltage value V1, and the output current Io has a current value (current command value) I1, only the first converter 21 operates (point A in FIG. 2). Thereafter, when the second to fourth converters 22 to 24 start operating, the input voltage Vi decreases to a voltage value V2 (<V1). Thus, the setter 14 varies the output characteristic, and in the varied output characteristic, the setter 14 sets the current command value I1 of the output current Io in the case of the input voltage Vi having the voltage value V2 (point B in FIG. 2). Then, after the second to fourth converters 22 to 24 start operating, the first converter 21 can stably output the output current Io having the current command value I1.

The power supply device 1 according to the first embodiment described above includes: the plurality of converters 2; the command section 11; and the setter 14. The plurality of converters 2 correspond to the plurality of loads 3 and are each configured to convert electric power supplied from the direct-current power supply 10 into electric power required by a corresponding one of the plurality of loads 3. The command section 11 is configured to control the plurality of converters 2. The setter 14 is configured to set the magnitude of an output (the output current Io) from at least one target converter (e.g., the first converter 21) of the plurality of converters 2 in accordance with an output characteristic. The output characteristic represents a relationship between the input voltage Vi of the at least one target converter (e.g., the first converter 21) of the plurality of converters 2 and an output limit value which is the upper limit value of the output from the at least one target converter. The output characteristic is a characteristic that the output limit value decreases as the input voltage Vi lowers when the input voltage Vi is lower than the threshold Vth. The setter 14 varies the threshold Vth of the output characteristic in accordance with the operation status of the plurality of converters 2 and sets the magnitude of the output in accordance with the output characteristic whose threshold Vth has been varied. The command section 11 includes a processor and/or a control circuit, which executes a program stored in the storage 13 or other non-volatile memory to carry out the functions described herein.

In the power supply device 1 according to the first embodiment, the threshold Vth (Vth1, Vth2) of the output characteristic representing the relationship between the input voltage Vi and the magnitude of the output (the output current Io) of the at least one target converter of the plurality of converters 2 is varied in accordance with the operation status of the plurality of converters 2. This enables a stable output from the target converter to the load 3 even when the plurality of converters 2 are provided.

The plurality of converters 2 do not necessarily correspond to the plurality of loads 3 on a one-to-one basis. One converter 2 may be provided to two or more loads 3. That is, it is only required that each of the plurality of converters 2 corresponds to at least one load 3.

Second Embodiment

A power supply device 1a according to a second embodiment is different from the power supply device 1 according to the first embodiment in that the change amount of an output current Io is set to be within a limit range. Components similar to those of the power supply device 1 according to the first embodiment are denoted by the same or similar reference signs, and the description thereof will be omitted.

Figure 3:
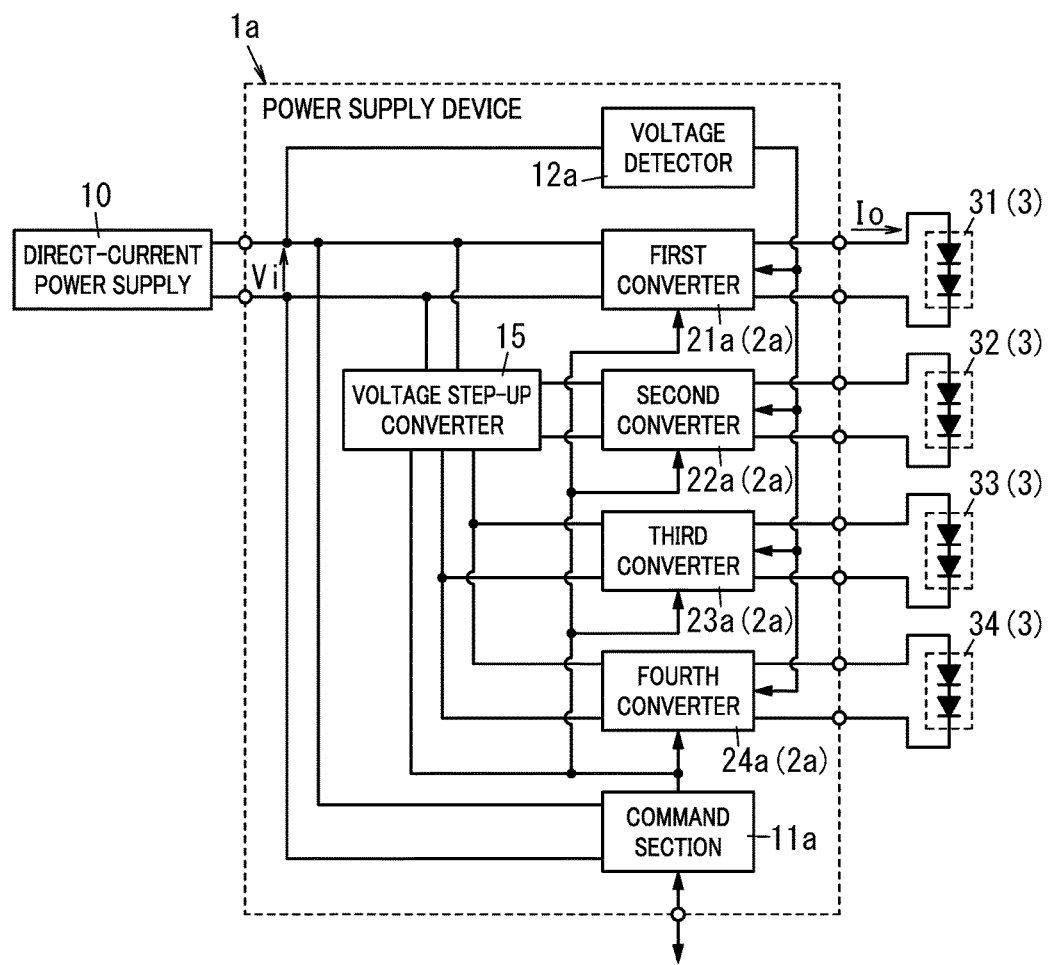
FIG. 3 is a block diagram illustrating a power supply device according to a second embodiment.

As illustrated in FIG. 3, the power supply device 1a according to the second embodiment includes a plurality of (in FIG. 3, four) converters 2a, a command section (command circuit) 11a configured to control the plurality of converters 2a, and a voltage detector (voltage detection circuit) 12a configured to detect an input voltage Vi of the plurality of converters 2a. Moreover, the power supply device 1a according to the second embodiment includes a voltage step-up converter 15.

The voltage step-up converter 15 is disposed between a direct-current power supply 10 and second to fourth converters 22a to 24a, steps up the input voltage Vi, and outputs a stepped-up voltage to each of the second to fourth converters 22a to 24a.

The command section 11a transmits signals individually to the plurality of converters 2a by using, for example, serial communication. Moreover, the command section 11a also transmits a signal to the voltage step-up converter 15. The description of functions similar to those of the command section 11 (see FIG. 1) of the first embodiment will be omitted.

Figure 4:
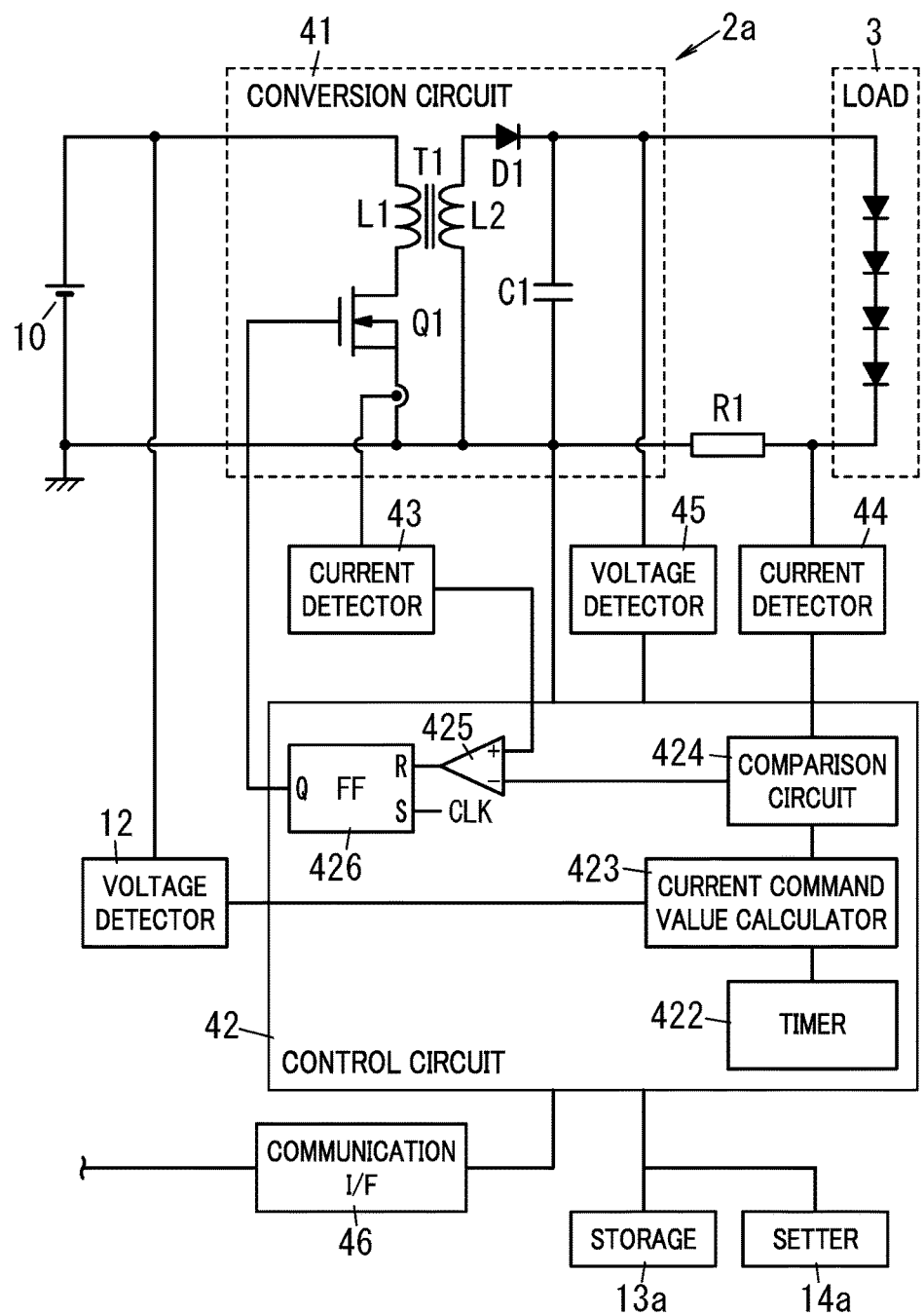
FIG. 4 is a circuit diagram illustrating a converter according to the second embodiment.

As illustrated in FIG. 4, each converter 2a includes a conversion circuit 41, a control circuit 42, two current detectors (current detection circuits) 43 and 44, a voltage detector (voltage detection circuit) 45, and a communication interface section (hereinafter referred to as "communication I/F") 46. The first to fourth converters 21a to 24a (see FIG. 3) may have the same electrical characteristics or may have electrical characteristics different from each other. That is, each of the first to fourth converters 21a to 24a has an electrical characteristic according to a corresponding one of loads 3 (a connected load 3).

The conversion circuit 41 includes a transformer T1, a switching element Q1, a diode D1, and a capacitor C1. The switching element Q1 is connected in series to a primary winding wire L1 of the transformer T1. The diode D1 is connected in series to a secondary winding wire L2 of the transformer T1. The capacitor C1 is connected in parallel to a series circuit of the secondary winding wire L2 of the transformer T1 and the diode D1.

The current detector 43 detects a primary current flowing through the primary winding wire L1 of the transformer T1 and outputs a primary current detection value (a value corresponding to the current value of the primary current) to the control circuit 42. The current detector 44 detects the output current Io (see FIG. 3) by a resistor R1 and outputs an output current detection value (a value corresponding to the current value of the output current Io) to the control circuit 42. The voltage detector 45 detects a voltage across the capacitor C1 and outputs a voltage detection value (a value corresponding to the voltage value of the voltage across the capacitor C1) to the control circuit 42. The communication I/F 46 is an interface for communication with the command section 11a (see FIG. 3).

The control circuit 42 includes a microcomputer and its peripheral circuits. The microcomputer executes a program stored in the storage 13a. The control circuit 42 includes a timer (time measuring circuit) 422, a current command value calculator (current command value calculating circuit) 423, a comparison circuit 424, a comparator 425, and a flip-flop 426. The timer 422 measures a time elapsed since a time point of a reduction of the input voltage Vi (see FIG. 3). The current command value calculator 423 determines a current reduction amount according to a time measurement result (the time elapsed since the time point of the reduction of the input voltage Vi) by the timer 422 and reduces a current command value from a storage 13a in accordance with the current reduction amount. If the current command value is larger than or equal to a limit value, the current command value calculator 423 sets a value obtained by adding/subtracting the limit value to/from the current command value from the storage 13a as a new current command value. The comparison circuit 424 compares the output current detection value of the output current Io from the current detector 44 with the new current command value and calculates a primary current command value such that the output current detection value becomes equal to the current command value. The comparator 425 outputs a reset signal to the flip-flop 426 in accordance with the relationship in the magnitude between the primary current detection value from the current detector 43 and the primary current command value from the comparison circuit 424. The flip-flop 426 is configured such that an output of the flip-flop 426 has a high (H) level in each cycle of a set signal which alternately has a high (H) level and a low (L) level at a high frequency so as to turn on the switching element Q1. When the primary current detection value reaches the primary current command value, the flip-flop 426 is reset.

In the conversion circuit 41, when the switching element Q1 is turned on, a primary current flows from the direct-current power supply 10 via the primary winding wire L1 of the transformer T1 to the switching element Q1, and energy is accumulated in the transformer T1. When a primary winding wire detection value reaches the primary current command value, an output of the comparator 425 is inverted, the flip-flop 426 is reset, so that the output of the flip-flop 426 has a low (L) level, and the switching element Q1 is turned off. When the switching element Q1 is turned off, counter-electromotive force due to the energy accumulated in the transformer T1 is generated in the secondary winding wire L2, thereby charging the capacitor C1 via the diode D1.

In the power supply device 1a according to the second embodiment, each of the plurality of converters 2a, but not the command section 11a, has a function of varying the threshold in an output characteristic.

Each converter 2a includes the storage 13a and further includes a setter 14a. The storage 13a stores the output characteristics of the converter 2a to which the storage 13a belongs. For example, a storage 13a of a first converter 21a stores the output characteristic of the first converter 21a, and a storage 13a of a second converter 22a stores the output characteristic of the second converter 22a. Moreover, a storage 13a of a third converter 23a stores the output characteristic of the third converter 23a, and a storage 13a of a fourth converter 24a stores the output characteristic of the fourth converter 24a. The setter 14a sets the magnitude (the current command value) of the output current Io in accordance with the output characteristics stored in the storage 13a.

Here, the current command value calculator 423 sets the current command value of the output current Io such that the change amount of the output current Io per unit time is within the limit range when the input voltage Vi is lower than the threshold Vth. The current command value calculator 423 corresponds to a limiter.

Next, operation of the power supply device 1a according to the second embodiment will be described. The storage 13a of the first converter 21a stores the output characteristics.

First, the case only the first converter 21a of the plurality of converters 2a operates will be described. At an initial time point, the output of the first converter 21a is off.

First, the command section 11a receives an ON command for operation of the first converter 21a and a current request value of the output current Io of the first converter 21a from an external apparatus (not shown). Then, the command section 11a transmits an operation start command and the current request value to the first converter 21a.

When receiving the operation start command and the current request value from the command section 11a, the first converter 21a determines whether or not the input voltage Vi is lower than the threshold Vth. If the input voltage Vi is higher than or equal to the threshold Vth, the first converter 21a sets the current command value to the current request value. In contrast, if the input voltage Vi is lower than the threshold Vth, the first converter 21a determines a current limit value corresponding to the input voltage Vi in accordance with the output characteristics stored in the storage 13a. If the current request value is larger than or equal to the current limit value, the first converter 21a sets the current command value to the current limit value. If the current request value is smaller than the current limit value, the first converter 21a sets the current command value to the current request value. Then, the first converter 21a operates such that the output current Io has the current command value.

Next, the case where the second to fourth converters 22a to 24a further operate after the first converter 21a starts operating will be described. The input voltage Vi is lower than the threshold Vth.

First, the command section 11a receives an ON command for operation of the second to fourth converters 22a to 24a and a current request value of the output current of the second to fourth converters 22a to 24a from an external apparatus. The command section 11a transmits an operation start command and a corresponding current request value to the second to fourth converters 22a to 24a.

When receiving the operation start command and the current request value, the second to fourth converters 22a to 24a start operating. Here, the operating of the second to fourth converters 22a to 24a reduces the input voltage Vi. The second to fourth converters 22a to 24a transmit operation information representing that they are in operation to the command section 11.

When obtaining the operation information from the second to fourth converters 22a to 24a, the command section 11a transmits the operation information of the second to fourth converters 22a to 24a to the first converter 21a.

Figure 6:
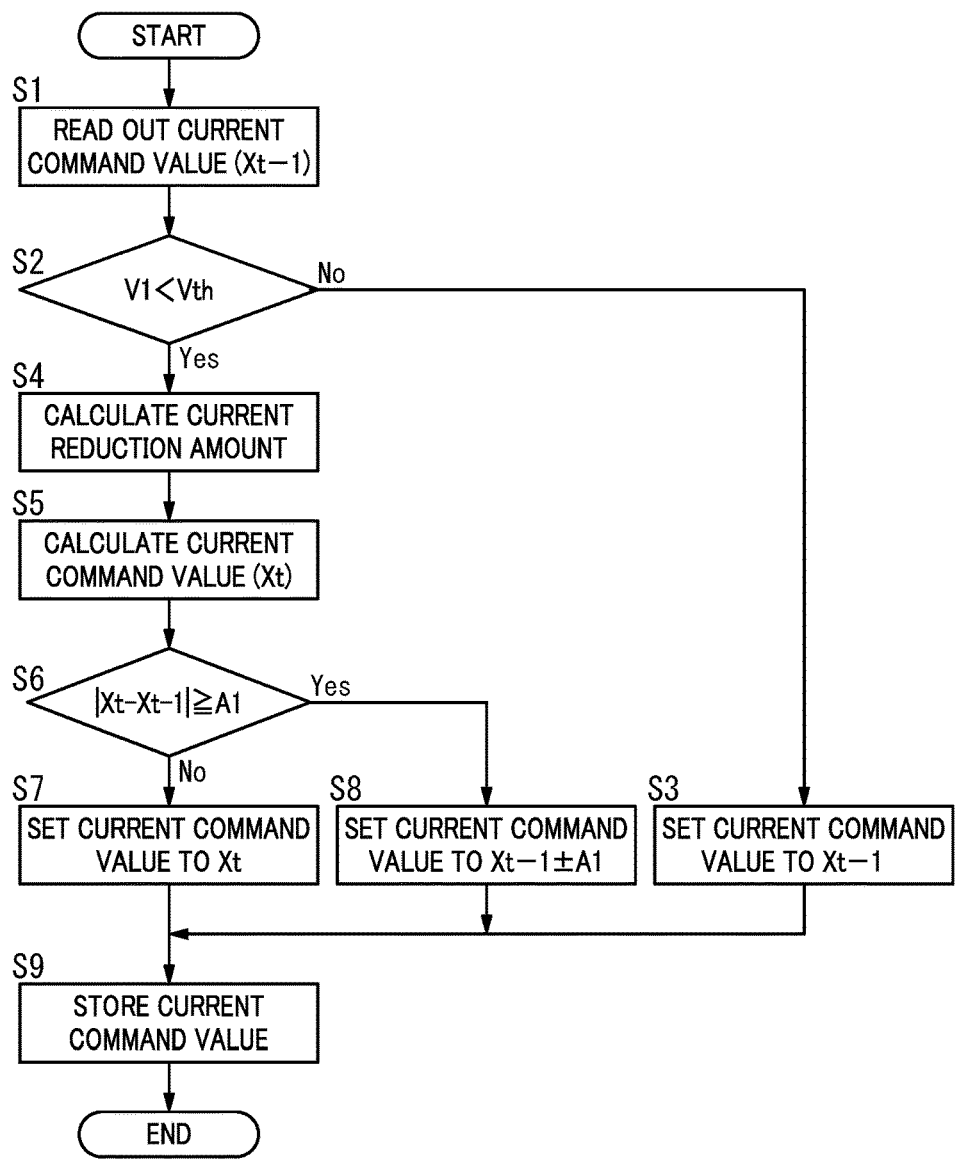
FIG. 6 is a flowchart illustrating the operation of the power supply device.

With reference to FIG. 6, subsequent processes will be described. First, the first converter 21a reads a current command value Xt−1 out of the storage 13a (S1 in FIG. 6). The first converter 21a determines whether or not the input voltage Vi is lower than the threshold Vth (S2). If the input voltage Vi is greater than or equal to the threshold Vth (No in S2), the first converter 21a sets the present current command value Xt−1 (the current command value Xt−1 which has been read) as a new current command value (S3).

In step S2, if the input voltage Vi is lower than the value Vth (Yes in S2), the first converter 21a determines, due to a reduction in the input voltage Vi, a current limit value corresponding to the input voltage Vi in accordance with the output characteristics stored in the storage 13a. Moreover, the first converter 21a obtains a current reduction amount (present current command value (point A in FIG. 5)−current limit value (point B in FIG. 5)) (S4). Then, the first converter 21a obtains a current command value Xt (S5).

Then, the first converter 21a determines whether or not an absolute value difference |Xt−Xt−1| between the current command value Xt obtained in step S5 and the present current command value Xt−1 is greater than or equal to a limit range A1 (S6). If the absolute value difference |Xt−Xt−1| is less than the limit range A1 (No in S6), the first converter 21a sets the new current command value to the current command value Xt obtained in step S4 (S7). In contrast, if the absolute value difference |Xt−Xt−1| is greater than or equal to the limit range A1 (Yes in S6), the first converter 21a sets the new current command value to a value Xt−1±A1 obtained by adding/subtracting the limit range A1 to/from the present current command value Xt−1 (S8). Then, the storage 13a stores the new current command value (S9).

Figure 5:
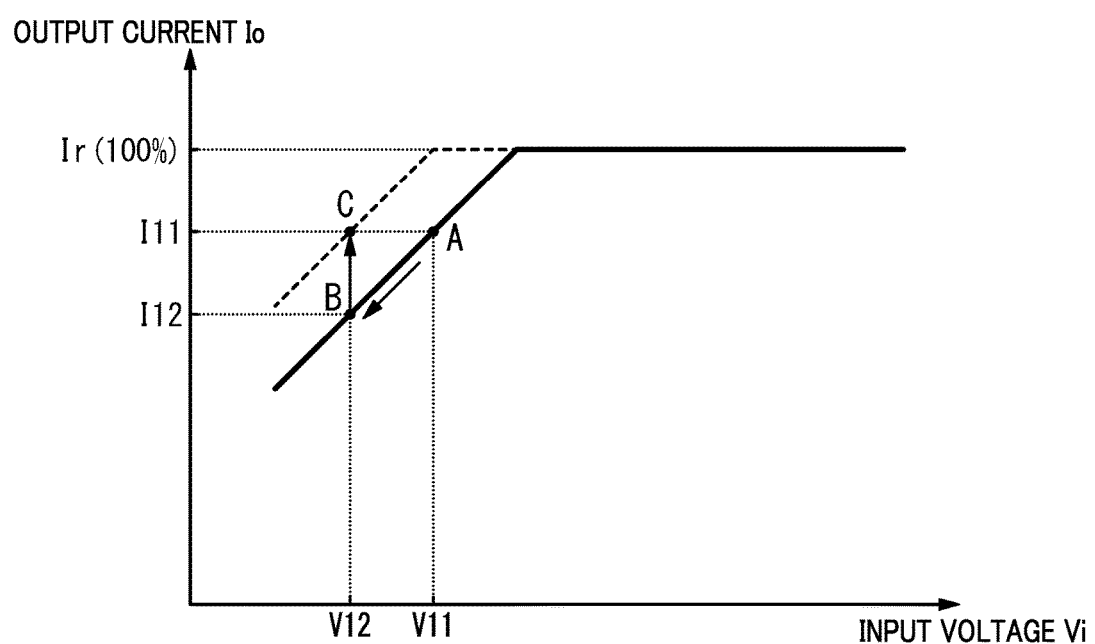
FIG. 5 is an explanatory drawing illustrating operation of the power supply device.

As illustrated in FIG. 5, when the input voltage Vi of the first converter 21a has the voltage value V11, and the output current Io has a current value (current command value) I11, only the first converter 21a operates (point A in FIG. 5). Then, when the second to fourth converters 22a to 24a start operating, the input voltage Vi decreases to a voltage value V12 (<V11). Here, the first converter 21a sets the current command value such that the change amount is within the limit range. Then, when the first converter 21a receives the operation information of the second to fourth converters 22a to 24a, the setter 14a varies the output characteristic, and in the varied output characteristic (broken line in FIG. 5), the setter 14a sets the current command value I11 of the output current Io in the case of the input voltage Vi having the voltage value V12 (point C in FIG. 5). Thus, after the second to fourth converters 22a to 24a start operating, the output current Io can be output without decreasing to a current value I12 (point B in FIG. 5).

Figure 7:
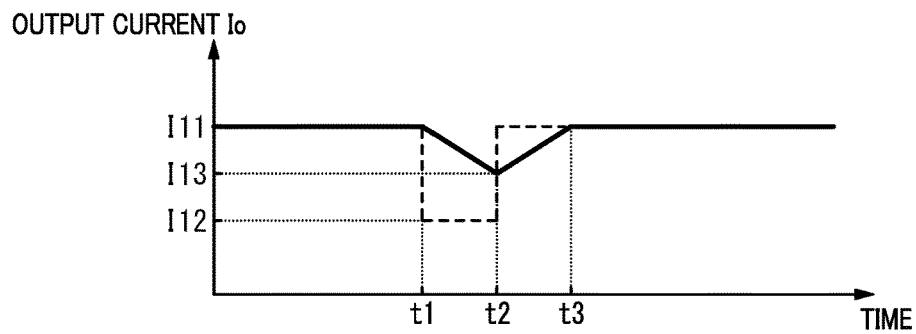
FIG. 7 is a time chart illustrating an output current from the power supply device.

In other words, as shown by the solid line in FIG. 7, even when the second to fourth converters 22a to 24a start operating (time t1), the output current Io does not instantaneously decrease from the current value I11 to the current value I12 but decreases gradually. Then, after the output current Io decreases to a current value I13 larger than the current value I12 (time t2), the output current Io increases from the current value I13 to the current value I11 (time t3) when the first converter 21a receives the operation information of the second to fourth converters 22a to 24a.

In contrast, in a comparative example, as indicated by the broken line in FIG. 7, when the second to fourth converters 22a to 24a start operating (time t1), the output current Io instantaneously decreases from the current value I11 to the current value I12. Then, when the first converter receives the operation information of the second to fourth converters (time t2), the output current Io instantaneously increases from the current value I12 to the current value I11.

The power supply device 1a according to the second embodiment described above further includes the limiter (the current command value calculator 423). The limiter is configured to limit the magnitude of the output (output current Io) to cause a change amount of the output per unit time to fall within the limit range A1 when the input voltage Vi is lower than the threshold Vth.

The power supply device 1a according to the second embodiment limits the magnitude of the output (output current Io) such that the change amount of the output is within the limit range A1, so that the occurrence of a rapid change of the output in a short time period can be reduced, which can suppress a rapid change of the operation of the load 3. When the load 3 is a light source, flickering can be reduced.

Even when each of the plurality of converters 2a has a function of varying the threshold Vth in the output characteristic, the current command value may be set in the same manner as in the first embodiment.

For example, as illustrated in FIG. 5, when the input voltage Vi of the first converter 21a has the voltage value V11 and the output current Io has the current value (current command value) I11, only the first converter 21a operates (point A in FIG. 5). Then, when the second to fourth converters 22a to 24a start operating, the input voltage Vi decreases to the voltage value V12 (<V11). Thus, the setter 14a sets the current command value of the output current Io to the current value I12 in the case of the input voltage Vi having the voltage value V12 (point B in FIG. 5). Then, when the first converter 21a receives the operation information of the second to fourth converters 22a to 24a, the setter 14a varies the output characteristic, and in the varied output characteristic, the setter 14a sets the current command value I11 of the output current Io in the case of the input voltage Vi having the voltage value V12 (point C in FIG. 5). Also in such a case, after the second to fourth converters 22a to 24a start operating, the first converter 21a can output the output current Io having the magnitude of the current command value I11.

Third Embodiment

A power supply device 1a according to a third embodiment is different from the power supply device 1a according to the second embodiment in that a threshold Vth is reduced in accordance with a combination of operating converters of a plurality of converters 2a. The power supply device 1a according to the third embodiment will be described with reference to FIG. 3. Components similar to those of the power supply device 1a according to the second embodiment are denoted by the same reference signs, and the description thereof will be omitted.

As shown in Table 1, a threshold reduction amount (reduction amount from a threshold Vth0 in a characteristic as a reference) is set in each of the plurality of converters 2a in advance. Numerical values shown in Table 1 are mere examples, and output and the threshold reduction amount are not limited to the numerical values shown in Table 1.

TABLE 1

| Type of Converter | Output | Threshold Reduction Amount |
| --- | --- | --- |
| First Converter | 30 W | 0.15 V |
| Second Converter | 40 W | 0.2 V |
| Third Converter | 10 W | 0.05 V |
| Fourth Converter | 5 W | 0.02 V |

Figure 8:
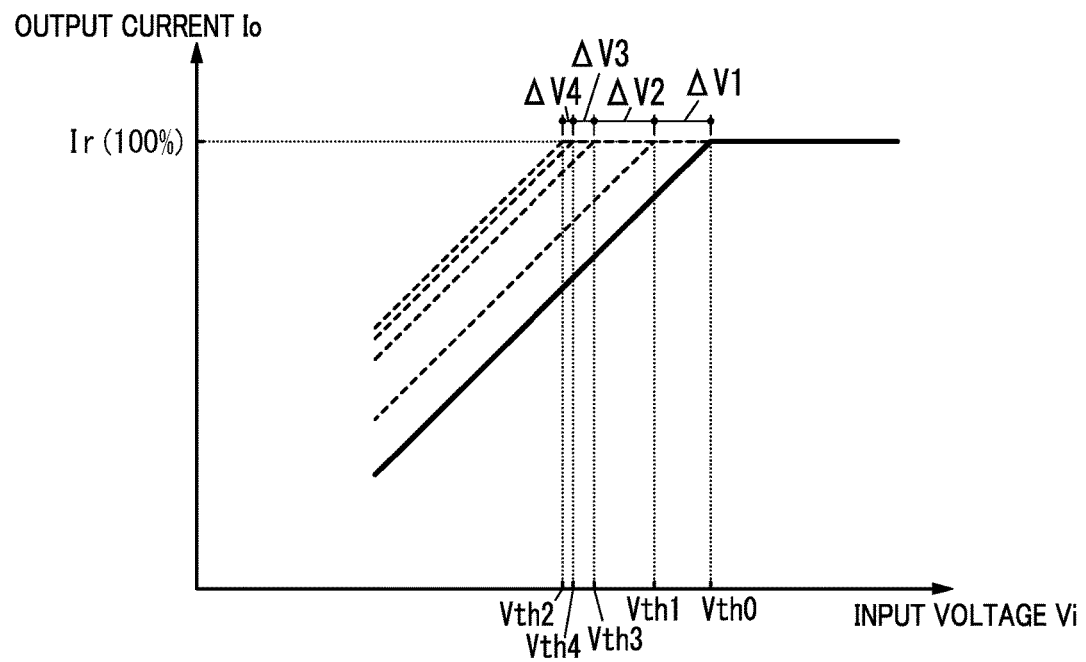
FIG. 8 is an explanatory drawing illustrating operation of a power supply device according to a third embodiment.

A storage 13a of the third embodiment stores the output characteristics shown in FIG. 8. The solid line in FIG. 8 represents an output characteristic in the case where none of the plurality of converters 2a operates. The threshold of the output characteristic is Vth0. This output characteristic is a characteristic as a reference. In the case where only a first converter 21a operates, the threshold Vth is Vth1 which is lower than Vth0 by a threshold reduction amount ΔV1 (=0.15 V) of the first converter 21a. When a second converter 22a also starts operating, the threshold is Vth3 which is lower than Vth1 by a threshold reduction amount ΔV2 of the second converter 22a. When a third converter 23a also starts operating, the threshold is Vth4 which is lower than Vth3 by a threshold reduction amount ΔV3 of the third converter 23a. When all of the first to fourth converters 21 to 24 operate, the threshold is Vth2 which is lower than Vth4 by a threshold reduction amount ΔV4. The output characteristics shown in FIG. 8 have constant angles of tilt of the output current Io with respect to the input voltage Vi in a range in which the input voltage Vi is lower than the threshold.

A setter 14a of the third embodiment reduces the threshold with respect to the threshold Vth0 of the characteristic as the reference in accordance with the combination of operating converters of the plurality of converters 2a. That is, the setter 14a reduces the threshold by the total of the threshold reduction amounts of operating converters. Specifically, the setter 14 varies the output characteristic in accordance with the combination of operating converters.

In the power supply device 1a according to the third embodiment described above, the setter 14a is configured to reduce the threshold Vth in accordance with a combination of operating converters of the plurality of converters 2a.

In the power supply device 1a according to the third embodiment, the threshold Vth decreases in accordance with the combination of operating converters, which enables setting of an output (output current Io) of a target converter to a magnitude suitable for the operation status of the plurality of converters 2a.

Fourth Embodiment

A power supply device 1a according to a fourth embodiment is different from the power supply device 1a according to the second embodiment in that a threshold Vth is reduced as the output current of operating converters of a plurality of converters 2a increases. With reference to FIG. 3, the power supply device 1a according to the fourth embodiment will be described. Components similar to those of the power supply device 1a according to the second embodiment are denoted by the same reference signs, and the description thereof will be omitted.

Threshold reduction amounts with respect to magnitudes of output currents Io of the converters 2a are set as illustrated in Table 2 in advance. Numerical values of the outputs represent proportions to a rated current Ir. The numerical values shown in Table 2 are mere examples, and the outputs and the threshold reduction amounts are not limited to the numerical values shown in Table 2.

TABLE 2

| Output | Threshold Reduction Amount |
| --- | --- |
| 5% | 0.11 V |
| 100% | 0.2 V |

Figure 9:
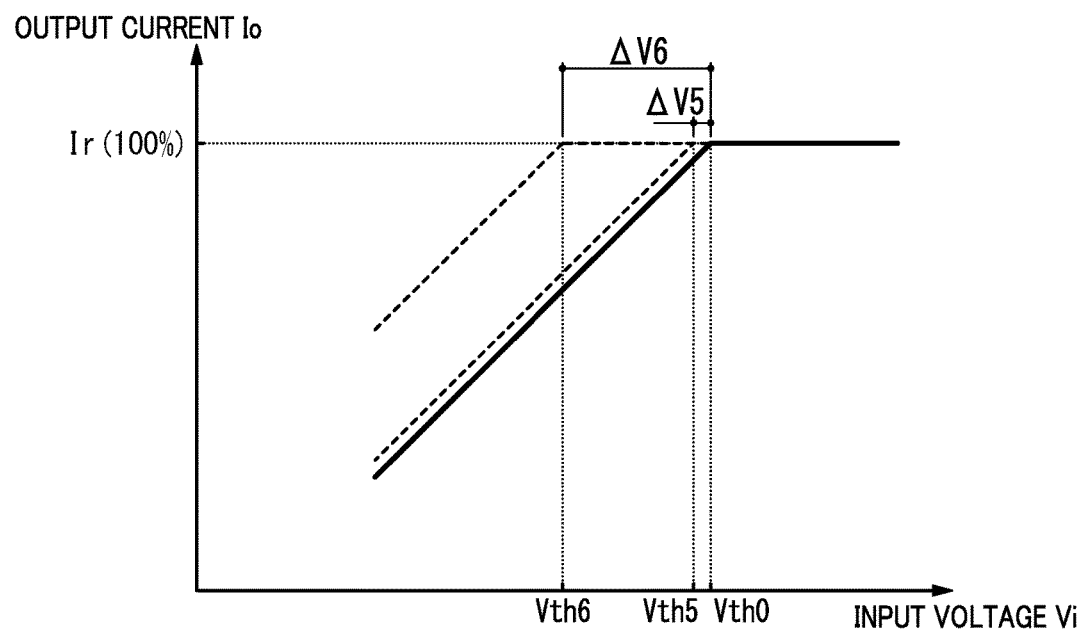
FIG. 9 is an explanatory drawing illustrating operation of a power supply device according to a fourth embodiment.

A storage 13a of the fourth embodiment stores output characteristics shown in FIG. 9. The solid line of FIG. 9 represents an output characteristic in the case where none of the plurality of converters 2a operates. The threshold of this output characteristic is Vth0. This output characteristic is a characteristic as a reference. When a fourth converter 24a operates at an output of 5%, the threshold is Vth5 which is lower than Vth0 by a threshold reduction amount $\Delta V5$ (=0.11 V). In contrast, when the fourth converter 24a operates at an output of 100%, the threshold is Vth6 which is lower than Vth0 by a threshold reduction amount $\Delta V6$ (=0.2 V). The output characteristics shown in FIG. 9 have constant angles of tilt of the output currents Io with respect to an input voltage Vi being in a range in which the input voltage Vi is lower than the threshold.

A setter 14a of the fourth embodiment reduces the threshold as the output currents Io of operating converters of the plurality of converters 2a increase. That is, the setter 14a varies the output characteristics in accordance with the outputs of the operating converters.

A command section 11a may reduce the threshold as output power of operating converters of the plurality of converters 2a increases. Moreover, the command section 11a may reduce the threshold as inputs (input voltage, input power) of operating converters of the plurality of converters 2a increase. That is, it is only required that the setter 14a is configured to reduce the threshold as the inputs or the outputs of the operating converters of the plurality of converters 2a increase.

In the power supply device 1a according to the fourth embodiment described above, the setter 14a is configured to reduce the threshold Vth as the input or the output (the output current Io) of operating converters of the plurality of converters 2a increases.

In the power supply device 1a according to the fourth embodiment, the reduction amount of the threshold Vth increases as the input or the output of the operating converter increases. Thus, the output of a target converter can be set to a magnitude suitable for the state of the inputs or the outputs of the operating converters.

Fifth Embodiment

Figure 10:
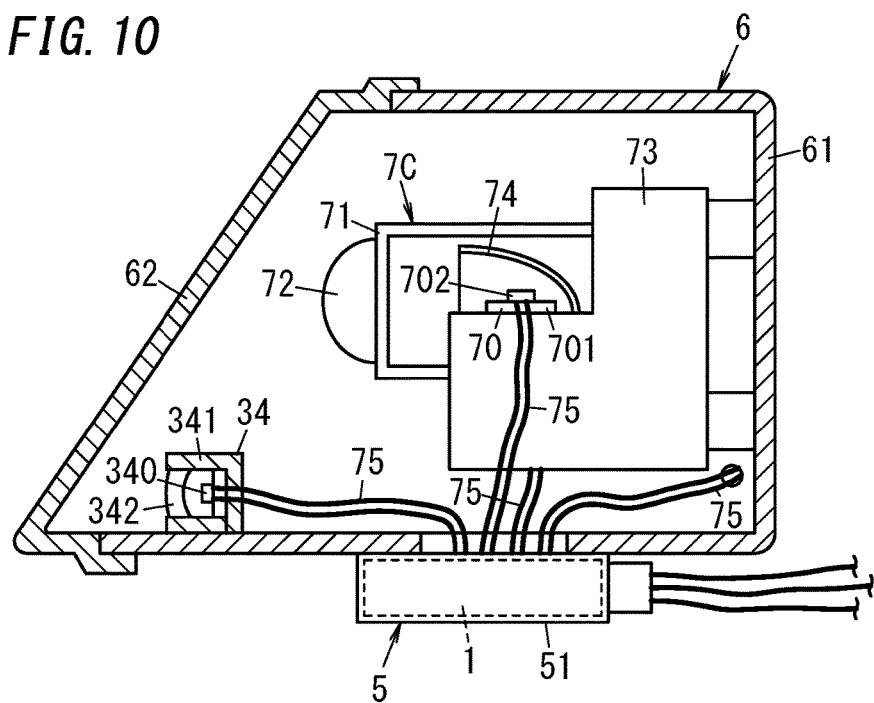
FIG. 10 is a side sectional view illustrating a lamp according to a fifth embodiment.
Figure 11:
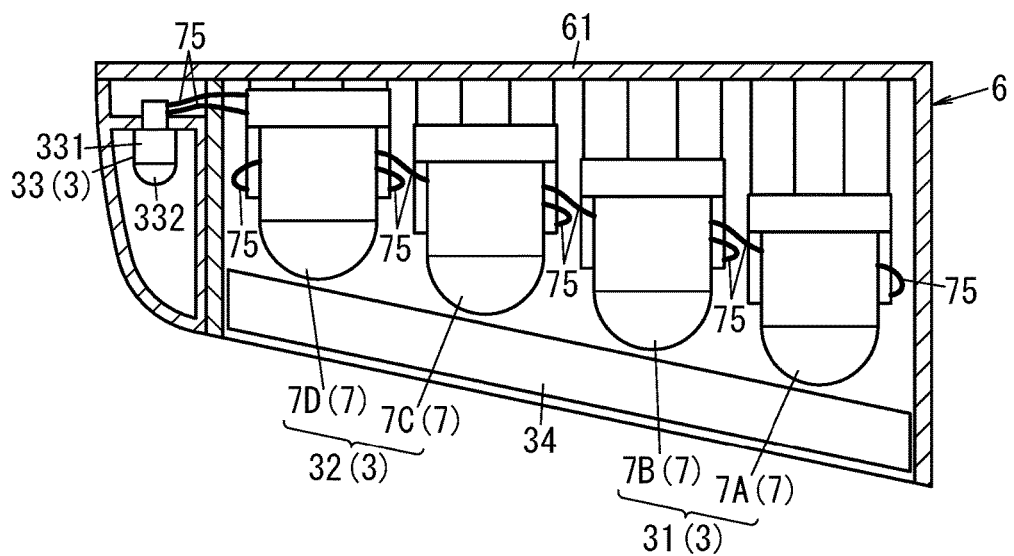
FIG. 11 is a plane sectional view illustrating the lamp.

A lamp 6 according to a fifth embodiment will be described. As illustrated in FIGS. 10 and 11, the lamp 6 is, for example, an automotive lamp, such as a headlamp, and includes a solid light-emitting element lighting device (hereinafter referred to as a "lighting device") 5, a plurality of (in FIG. 11, four) loads 3 (31 to 34), a lamp body (automotive lamp body) 61, and a cover 62.

In the lamp 6, the first load 31 is a high beam including a first light source unit 7A and a second light source unit 7B, and the second load 32 is a low beam including a third light source unit 7C and a fourth light source unit 7D. The third load 33 is a direction indicator, and the fourth load 34 is a Daytime Running Lamps (DRL). Each load 3 is electrically connected to the lighting device 5 via an electric cable 75.

As illustrated in FIG. 10, the lighting device 5 includes a power supply device 1 and a case 51 made of metal, and the lighting device 5 is attached to a lower surface of the lamp body 61. The lighting device 5 is supplied with electric power from a direct-current power supply 10 (see FIG. 1). Moreover, the lighting device 5 is connected to a control unit (not shown) of a vehicle. The control unit transmits a command of lighting/extinguishing an LED via a communication line to the lighting device 5, and the lighting device 5 controls the lighting/extinguishing of the LED (for example, communication is performed via LIN). The lighting device 5 may include the power supply device 1a according to any of the second to fourth embodiments instead of the power supply device 1 of the first embodiment.

The lamp body 61 is made of a synthetic resin and has a box shape with its front surface being open. The cover 62 is made of a light-transmissive material such as glass and an acrylic resin and has a box shape with its rear surface being open. The lamp body 61 has a front end coupled to a rear end of the cover 62. The lamp body 61 accommodates the plurality of loads 3.

The light source units 7A and 7B forming the first load 31 and the light source units 7C and 7D forming the second load 32 basically have a common structure. Thus, with reference to FIG. 10, the structure of the third light source unit 7C will be described representatively. The third light source unit 7C includes an LED 70, a housing 71, a lens 72, a heat sink member 73, and a reflective member 74. The LED 70 includes an LED chip 702 mounted on a mounting substrate 701. The housing 71 is made of a metal material, has a box shape, and accommodates the LED 70. The lens 72 is made of a light-transmissive material such as glass and an acrylic resin and has a semispherical shape. The heat sink member 73 is made by, for example, aluminum die casting. The reflective member 74 is made of a metal material such as an aluminum plate and has a semispherical shape. Light emitted from the LED 70 is reflected off an inner peripheral surface of the reflective member 74 and is then collected by the lens 72. As illustrated in FIG. 11, the four light source units 7A to 7D (7) are laterally arranged in a line in the lamp body 61.

As illustrated in FIG. 11, the third load 33 includes a housing 331 and a lens 332. Moreover, although not shown, the third load 33 includes an LED accommodated in the housing 331. The housing 331 is made of a metal material and has a box shape. The lens 332 is made of a light-transmissive material such as glass and an acrylic resin and has a semispherical shape. The lens 332 is attached to a tip of the housing 331. The third load 33 is arranged in the lamp body 61 adjacently to the four light source units 7A to 7D.

As illustrated in FIGS. 10 and 11, the fourth load 34 includes a housing 341 and a lens 342. Moreover, the fourth load 34 includes an LED 340 accommodated in the housing 341. The housing 341 is made of a metal material and has a box shape. The lens 342 is made of a light-transmissive material such as glass and an acrylic resin and has a rectangular shape. The lens 342 is attached to a tip of the housing 331. The fourth load 34 is arranged in the lamp body 61 on a front lower side of the four light source units 7A and 7D.

The solid light-emitting element lighting device 5 according to the fifth embodiment described above includes the power supply device 1. The plurality of loads 3 are solid-state light-emitting elements connected to an output of the power supply device 1.

In the solid light-emitting element lighting device 5 according to the fifth embodiment, the power supply device 1 according to the first embodiment is used. This enables a stable output from the target converter to the load 3 even when the plurality of converters 2 are provided. The power supply device 1a according to the second embodiment may be used. This enables a stable output from the target converter to the load 3 even when the plurality of converters 2a are provided.

The lamp 6 according to the fifth embodiment includes the solid light-emitting element lighting device 5, the plurality of solid-state light-emitting elements (the plurality of loads 3) to be lit by the solid light-emitting element lighting device 5, and the lamp body 61 accommodating the plurality of solid-state light-emitting elements.

In the fifth embodiment, the lamp 6 including the power supply device 1 according to the first embodiment is used. This enables a stable output from the target converter to the load 3 even when the plurality of converters 2 are provided. The lamp 6 including the power supply device 1a according to the second embodiment may be used. This enables a stable output from the target converter to the load 3 even when the plurality of converters 2a are provided.

Sixth Embodiment

Figure 12:
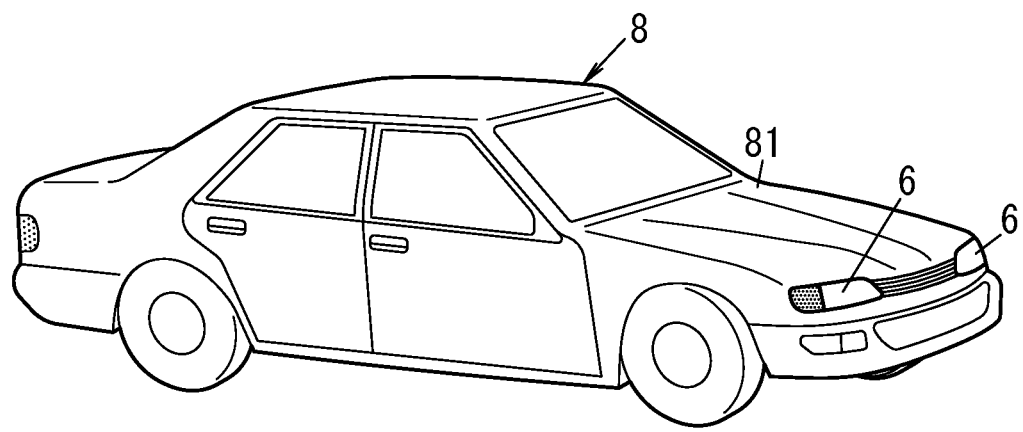
FIG. 12 is a perspective view illustrating a vehicle according to a sixth embodiment.

A vehicle 8 according to a sixth embodiment will be described. As illustrated in FIG. 12, the vehicle 8 according to the sixth embodiment includes a plurality of the lamps 6 (in FIG. 12, two lamps 6) according to the fifth embodiment and a vehicle body 81 to which the lamps 6 are attached. The lamps 6 according to the fifth embodiment are arranged respective left and light parts of a front end of the vehicle body 81 of the vehicle 8. That is, the lamps 6 according to the fifth embodiment are used as headlights of the vehicle 8.

The vehicle 8 according the sixth embodiment described above includes the lamps 6 and the vehicle body 81 on which the lamps 6 are attached.

The vehicle 8 according to the sixth embodiment includes a power supply device 1 which controls a plurality of converters 2 corresponding to a plurality of loads 3 on a one-to-one basis by using one command section 11. Alternatively, the vehicle 8 may include a power supply device 1a which controls a plurality of converters 2a corresponding to the plurality of loads 3 on a one-to-one basis by using one command section 11a. This facilitates attaching the lamps 6 to the vehicle body 81 and enables expansion of a range of design choices of the vehicle 8.

SUMMARY

As can be clearly seen from the above-described embodiments, a power supply device (1; 1a) according to a first aspect includes a plurality of converters (2; 2a), a command circuit (command section 11; 11a), and a setting circuit (setter 14; 14a). The plurality of converters (2; 2a) are each configured to convert electric power supplied from a direct-current power supply (10) into electric power required by a corresponding load (3) of a plurality of loads (3). The command circuit (command section 11; 11a) is configured to control the plurality of converters (2; 2a). The setting circuit (setter 14; 14a) is configured to set a magnitude of an output (output current Io) from at least one target converter of the plurality of converters (2; 2a) in accordance with an output characteristic. The output characteristic represents a relationship between an input voltage (Vi) of the at least one target converter and an output limit value which is an upper limit value of the output from the at least one target converter. The output characteristic is a characteristic that the output limit value decreases as the input voltage (Vi) lowers when the input voltage (Vi) is lower than a threshold (Vth). The setting circuit (setter 14; 14a) varies the threshold (Vth) of the output characteristic in accordance with an operation status of the plurality of converters (2; 2a) and sets the magnitude of the output from the at least one target converter in accordance with the output characteristic whose threshold (Vth) has been varied by the setting circuit (setter 14; 14a).

A power supply device (1a) according to a second aspect referring to the first aspect further includes a limiter. The limiter is configured to limit the magnitude of the output to cause a change amount of the output per unit time to fall within a limit range (A1) when the input voltage (Vi) is lower than the threshold (Vth).

In a power supply device (1a) according to a third aspect referring to the first or second aspect, the setting circuit (setter 14a) is configured to reduce the threshold (Vth) in accordance with a combination of operating converters of the plurality of converters (2a).

In a power supply device (1a) according to a fourth aspect referring to the third aspect, the setting circuit (setter 14a) is configured to reduce the threshold (Vth) in accordance with a combination of predefined threshold reduction amounts of the operating converters of the plurality of converters (2a).

In a power supply device (1a) according to a fifth aspect referring to any one of the first to fourth aspects, the setting circuit (setter 14a) is configured to reduce the threshold (Vth) as an input or an output of an operating converter of the plurality of converters (2a) increases.

A power supply device (1; 1a) according to a sixth aspect referring to any one of the first to fifth aspects further includes a storage (13; 13a). The storage (13; 13a) stores the output characteristic in a form of at least one of a function and a look-up table.

In a power supply device (1; 1a) according a seventh aspect referring to any one of the first to sixth aspects, the output limit value of the output characteristic decreases linearly with respect to the input voltage (Vi).

In a power supply device (1; 1a) according an eighth aspect referring to any one of the first to seventh aspects, the output characteristic represents a relationship between the input voltage (Vi) and an output current (Io) of the at least one target converter.

In a power supply device (1; 1a) according a ninth aspect referring to any one of the first to seventh aspects, the output characteristic represents a relationship between the input voltage (Vi) and an output current of the at least one target converter.

A solid light-emitting element lighting device (5) according to a tenth aspect includes the power supply device (1; 1a) according to any one of the first to ninth aspects. The plurality of loads (3) are solid-state light-emitting elements connected to the power supply device (1; 1a).

A lamp (6) according to an eleventh aspect includes the solid light-emitting element lighting device (5) according to the tenth aspect, the plurality of solid-state light-emitting elements (loads 3), and a lamp body (61). The plurality of solid-state light-emitting elements are lit by the solid light-emitting element lighting device (5). The lamp body (61) accommodates the plurality of solid-state light-emitting elements.

An automotive lamp (lamp 6) according to a twelfth aspect includes the solid light-emitting element lighting device (5) according to the tenth aspect, the plurality of solid-state light-emitting elements (loads 3), and an automotive lamp body (lamp body 61). The plurality of solid-state light-emitting elements are lit by the solid light-emitting element lighting device (5). The automotive lamp body accommodates the plurality of solid-state light-emitting elements.

A vehicle (8) according to a thirteenth aspect includes the lamp (6) according to the eleventh aspect, and a vehicle body (81) to which the lamp (6) is attached.

A method according to a fourteenth aspect is for controlling a plurality of power converters (2; 2a). The plurality of converters (2; 2a) are each configured to convert electric power supplied from a direct-current power supply (10) into electric power required by a corresponding load (3) of a plurality of loads (3). The method includes setting a magnitude of an output (output current Io) from at least one target converter of the plurality of converters (2; 2a) in accordance with an output characteristic. The output characteristic represents a relationship between an input voltage (Vi) of the at least one target converter and an output limit value which is an upper limit value of the output from the at least one target converter. The output characteristic is a characteristic that the output limit value decreases as the input voltage (Vi) lowers when the input voltage (Vi) is lower than a threshold (Vth). The method further includes varying the threshold (Vth) of the output characteristic in accordance with an operation status of the plurality of converters (2; 2a) and setting the magnitude of the output from the at least one target converter in accordance with the output characteristic whose threshold (Vth) has been varied.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A power supply device, comprising:
    a plurality of converters each configured to convert electric power supplied from a direct-current power supply into electric power required by a corresponding load of a plurality of loads;
    a command circuit configured to control the plurality of converters; and
    a setting circuit configured to set a magnitude of an output from at least one target converter of the plurality of converters in accordance with an output characteristic representing a relationship between an input voltage of the at least one target converter and an output limit value which is an upper limit value of the output from the at least one target converter, wherein
    the output characteristic is a characteristic that the output limit value decreases as the input voltage lowers when the input voltage is lower than a threshold, and
    the setting circuit varies the threshold of the output characteristic in accordance with an operation status of the plurality of converters and sets the magnitude of the output from the at least one target converter in accordance with the output characteristic whose threshold has been varied by the setting circuit.

2. The power supply device according to claim 1, further comprising:
    a limiter configured to limit the magnitude of the output to cause a change amount of the output per unit time to fall within a limit range when the input voltage is lower than the threshold.

3. The power supply device according to claim 2, wherein the setting circuit is configured to reduce the threshold in accordance with a combination of operating converters of the plurality of converters.

4. The power supply device according to claim 2, wherein the setting circuit is configured to reduce the threshold as an input or an output of an operating converter of the plurality of converters increases.

5. A solid light-emitting element lighting device, comprising the power supply device according to claim 2, wherein
    the plurality of loads are solid-state light-emitting elements connected to the power supply device.

6. A lamp, comprising:
    the solid light-emitting element lighting device according to claim 5;
    a plurality of solid-state light-emitting elements to be lit by the solid light-emitting element lighting device; and
    a lamp body accommodating the plurality of solid-state light-emitting elements.

7. The power supply device according to claim 1, wherein the setting circuit is configured to reduce the threshold in accordance with a combination of operating converters of the plurality of converters.

8. The power supply device according to claim 7, wherein the setting circuit is configured to reduce the threshold in accordance with a combination of predefined threshold reduction amounts of the operating converters of the plurality of converters.

9. The power supply device according to claim 7, wherein the setting circuit is configured to reduce the threshold as an input or an output of an operating converter of the plurality of converters increases.

10. A solid light-emitting element lighting device, comprising the power supply device according to claim 7, wherein
    the plurality of loads are solid-state light-emitting elements connected to the power supply device.

11. The power supply device according to claim 1, wherein
    the setting circuit is configured to reduce the threshold as an input or an output of an operating converter of the plurality of converters increases.

12. The power supply device according to claim 1, further comprising
a memory which stores the output characteristic in a form of at least one of a function and a look-up table.

13. The power supply device according to claim 1, wherein
the output limit value of the output characteristic decreases linearly with respect to the input voltage.

14. The power supply device according to claim 1, wherein
the output characteristic represents a relationship between the input voltage and an output current of the at least one target converter.

15. The power supply device according to claim 1, wherein
the output characteristic represents a relationship between the input voltage and an output power of the at least one target converter.

16. A solid light-emitting element lighting device, comprising the power supply device according to claim 1, wherein
the plurality of loads are solid-state light-emitting elements connected to the power supply device.

17. A lamp, comprising:
the solid light-emitting element lighting device according to claim 16;
a plurality of solid-state light-emitting elements to be lit by the solid light-emitting element lighting device; and
a lamp body accommodating the plurality of solid-state light-emitting elements.

18. A vehicle, comprising:
the lamp according to claim 17; and
a vehicle body to which the lamp is attached.

19. An automotive lamp, comprising:
the solid light-emitting element lighting device according to claim 16;
a plurality of solid-state light-emitting elements to be lit by the solid light-emitting element lighting device; and
an automotive lamp body accommodating the plurality of solid-state light-emitting elements.

20. A method for controlling a plurality of power converters, the plurality of converters each configured to convert electric power supplied from a direct-current power supply into electric power required by a corresponding load of a plurality of loads, comprising:
setting, by a setter, a magnitude of an output from at least one target converter of the plurality of converters in accordance with an output characteristic representing a relationship between an input voltage of the at least one target converter and an output limit value which is an upper limit value of the output from the at least one target converter, wherein
the output characteristic is a characteristic that the output limit value decreases as the input voltage lowers when the input voltage is lower than a threshold, and
varying, by the setter, the threshold of the output characteristic in accordance with an operation status of the plurality of converters and setting the magnitude of the output from the at least one target converter in accordance with the output characteristic whose threshold has been varied.

\* \* \* \* \*